United States Patent
Calhoon

(10) Patent No.: US 7,134,027 B2
(45) Date of Patent: Nov. 7, 2006

(54) INITIATING COMPUTER SYSTEM POWER-UP FROM A USB KEYBOARD

(75) Inventor: John C. Calhoon, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 10/348,924

(22) Filed: Jan. 22, 2003

(65) Prior Publication Data

US 2004/0143768 A1 Jul. 22, 2004

(51) Int. Cl.
*G06F 1/26* (2006.01)
(52) U.S. Cl. ........................ 713/300; 713/310
(58) Field of Classification Search ................ 713/300, 713/310
See application file for complete search history.

(56) References Cited

U.S. PATENT DOCUMENTS

| | | | | |
|---|---|---|---|---|
| 4,342,210 | A * | 8/1982 | Denningham | 70/278.1 |
| 5,499,184 | A * | 3/1996 | Squibb | 363/100 |
| 5,692,203 | A * | 11/1997 | Grodevant | 713/323 |
| 5,767,844 | A * | 6/1998 | Stoye | 345/212 |
| 6,205,502 | B1 * | 3/2001 | Endo et al. | 710/100 |
| 6,256,682 | B1 * | 7/2001 | Gudan et al. | 710/14 |
| 6,388,854 | B1 | 5/2002 | Berstis et al. | |
| 6,415,342 | B1 | 7/2002 | Wahl et al. | |
| 6,490,136 | B1 | 12/2002 | Ito et al. | |
| 6,625,738 | B1 * | 9/2003 | Shiga | 713/310 |
| 6,717,531 | B1 * | 4/2004 | Hayashi | 341/22 |
| 6,867,985 | B1 | 3/2005 | Westerinen et al. | |

OTHER PUBLICATIONS

*Philips* Product description; ISP1130; Universal Serial Bus compound hub with integrated keyboard controller (4 pgs.).
Universal Serial Bus Specification, Revision 2.0, Apr. 27, 2000 (622 pgs.).
Compaq Computer, Intel Corporation, Microsoft Corporation, Phoenix Technologies Ltd., Toshiba Corporation; Advanced Configuration and Power Interface (ACPI) Specification; Revision 2.0a; Mar. 31, 2002 © 1996-2002.
U.S. Appl. No. 60/422,428, filed Oct. 30, 2002, inventor Westerinen et al.
U.S. Appl. No. 10/383,091, filed May 6, 2004, inventor Westerien et al.
U.S. Appl. No. 10/780,039, filed Aug. 18, 2005, inventor Anderson et al.

* cited by examiner

*Primary Examiner*—Thomas Lee
*Assistant Examiner*—Vincent Tran
(74) *Attorney, Agent, or Firm*—Woodcock Washburn LLP

(57) ABSTRACT

A keyboard connected to a computer by a USB cable has a power button for use when the computer is in a power-down state to initiate a system power-up operation. The data wires of the USB cable are connected to a first switch in the keyboard and a second switch in the computer. When the computer is on, the switches connect the data wires to respective data lines in the keyboard and the computer such that the data wires can be used for data transmission. When the computer is in the power-down state, the first switch connects the data wires of the USB bus to a power button on the keyboard, and the second switch connects the other ends of the data wires to a system power-up circuit of the computer. When a user presses the power button, a trigger signal is sent via the data wires of the USB bus to the system power-up circuit, thereby initiating the system power-up operation.

8 Claims, 3 Drawing Sheets

INITIATING COMPUTER SYSTEM POWER-UP FROM A USB KEYBOARD

TECHNICAL FIELD

This invention relates generally to powering up a computer, and more particularly to a way to initiate the power-up operation of a computer system using a power button on a keyboard.

BACKGROUND OF THE INVENTION

Powering a computer up and powering it down are basic operations of the computer. To that end, a computer typically has a power button on its house (e.g., on its front panel) that a user can press to initiate a power-up or power-down operation of the computer. Depending on the power-saving scheme implemented in the computer, the power button may be used to bring the computer from the normal operational (i.e., "on") state to one of the power-saving states, such as the S1–S3 states of the Advanced Configuration and Power Interface (ACPI) specification, or to a power-down state, such as the S4 or S5 state of the ACPI.

In some computer configurations, for ease of access or other reasons, it is often desirable to have a system power button at a location separate from the computer housing, such as on a keyboard or the like. For example, the computer may be placed at a location that makes the power button on the computer housing hard to reach, and it would be more convenient for the user to use a power button on the keyboard to turn the computer on or off. The wiring between the computer and the keyboard, however, may limit the functionality of such a button. For instance, today's USB keyboards (i.e., keyboards connected to computers via Universal Serial Bus ("USB") cables) often have a Sleep button that can be used to place the computer into the S1–S5 ACPI states. The Sleep button, however, can only be used to wake the system from the S1, S2 and S3 states, and cannot be used to power up the computer from the S4 or S5 state. This is because the signal generated by pressing the Sleep button has to be transmitted from the keyboard to the computer over the USB bus, which is not operational when the computer is powered down. Thus, there is a need for a way to provide a power button on a USB keyboard that can be used to initiate system power-up.

SUMMARY OF THE INVENTION

In view of the foregoing, the present invention provides a way to incorporate a power button on a USB keyboard that can be pressed to power the system up, without the need for using additional lines in the cable connecting the keyboard and the computer. The keyboard is connected to the computer via a USB bus having two data wires. In accordance with the invention, the data wires of the USB bus are connected to a first switch in the keyboard and a second switch in the computer. When the computer is on, the switches connect the USB data wires to respective data lines in the keyboard and the computer such that the data wires can be used for regular data transmission. When the computer is in a power-down state, the first switch connects the data wires of the USB bus to the power button on the keyboard, and the second switch connects the data wires to a system power-up circuit of the computer. Thus, when a user presses the power button, a trigger signal is sent via the data wires of the USB bus to the system power-up circuit, thereby initiating the system power-up operation.

DETAILED DESCRIPTION OF THE INVENTION

Figure 1:
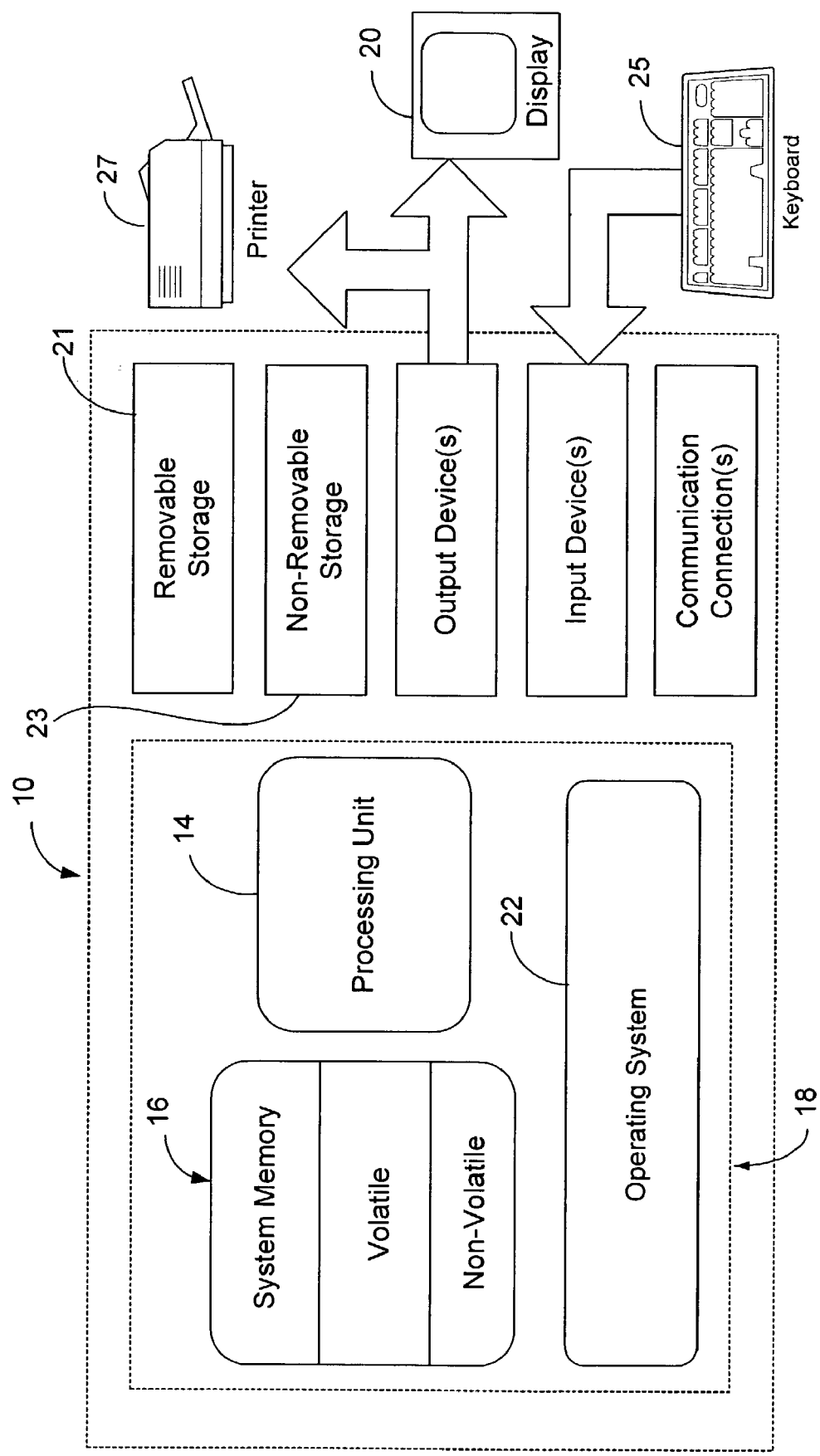
FIG. 1 is a block diagram generally illustrating an exemplary computer system in which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 2:
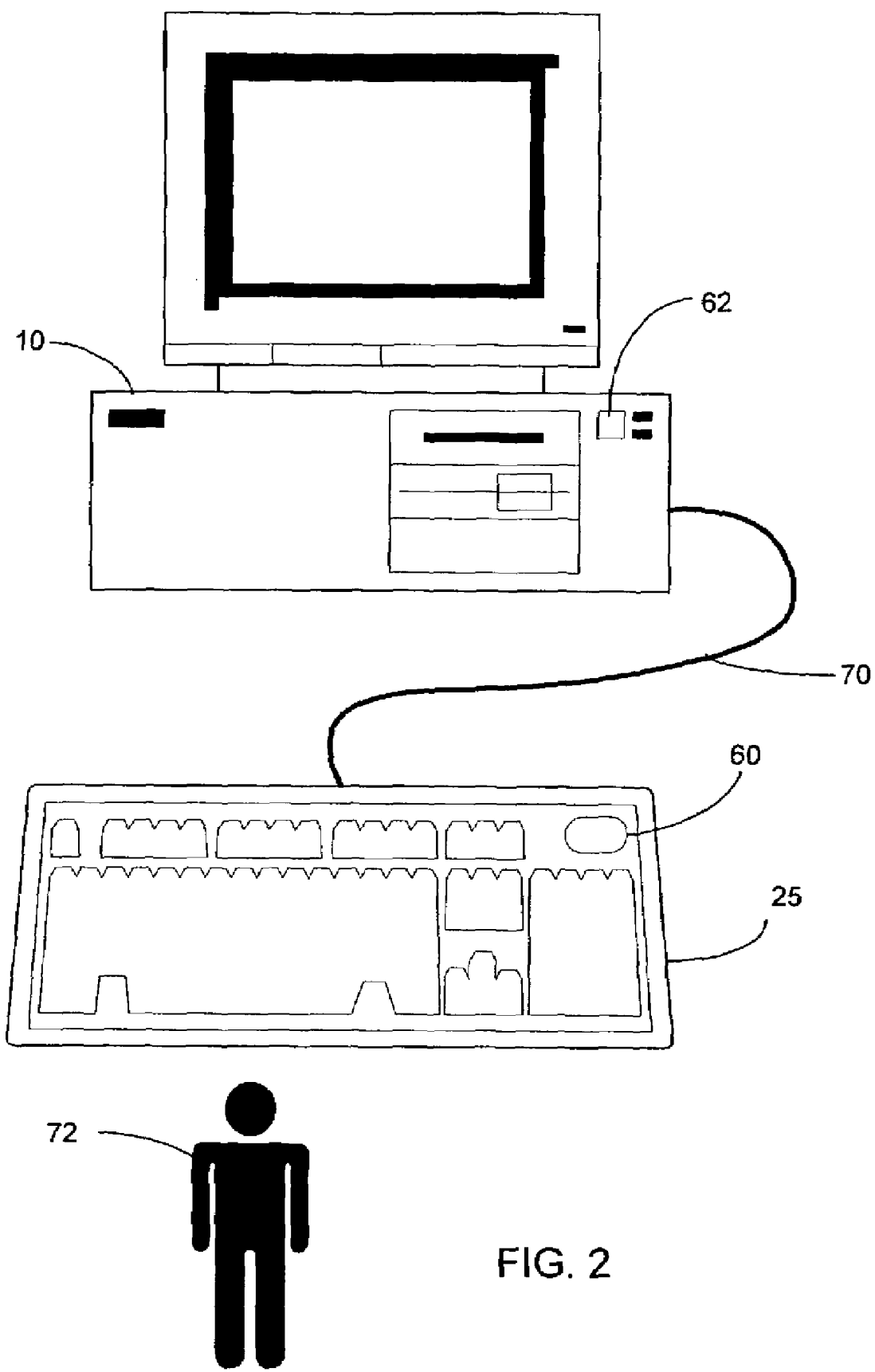
FIG. 2 is a schematic diagram showing a computer system with a keyboard that is connected to a computer via a USB cable has a power button thereon.

The following description begins with a description of a general-purpose computing device that may be used in a computer system for implementing the USB keyboard with a power button in accordance with the invention, and the invention will be described in greater detail with reference to FIGS. 2 and 3. Turning now to FIG. 1, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. At least some of these instructions are generated by an operating system 22. The operating system 22 may include several user mode and kernel mode programs. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18. Additionally, the computer may also have additional features/functionality. For example, computer 10 may also include additional storage (such as a removable storage 21 and/or a non-removable storage 23) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 10. Any such computer storage media may be part of computer 10.

Computer 10 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term "computer-readable medium" as used herein includes both computer storage media and communication media.

Computer 10 may also have input devices such as a keyboard 25, mouse, pen, voice input device, touch input device, etc. Output devices such as a display 20, speakers, a printer 27, etc. may also be included. The general operations of all these devices are well known in the art and need not be discussed at length here. Nevertheless, as described below, the keyboard 25 is implemented in accordance with the invention to have a power button for initiating a system power-up operation.

Referring to FIG. 2, the present invention provides a computer system that allow a user to initiate system power-up using a power button 60 located on a keyboard 25 connected to the computer via a Universal Serial Bus (USB) cable 70. The keyboard 25 is referred to herein as a "USB keyboard" for the reason that it is connected to the computer a USB cable (or bus). When the computer 10 is in a power-down state, a user 72 can initiate the system power-up operation of the computer system by pressing the power button 60. As described in greater detail below, this power button feature is provided without the need to use additional signal lines between the keyboard and the computer. In the illustrated embodiment, the computer also has a power button 62 located on the front panel of the computer housing for powering the computer on or off.

Figure 3:
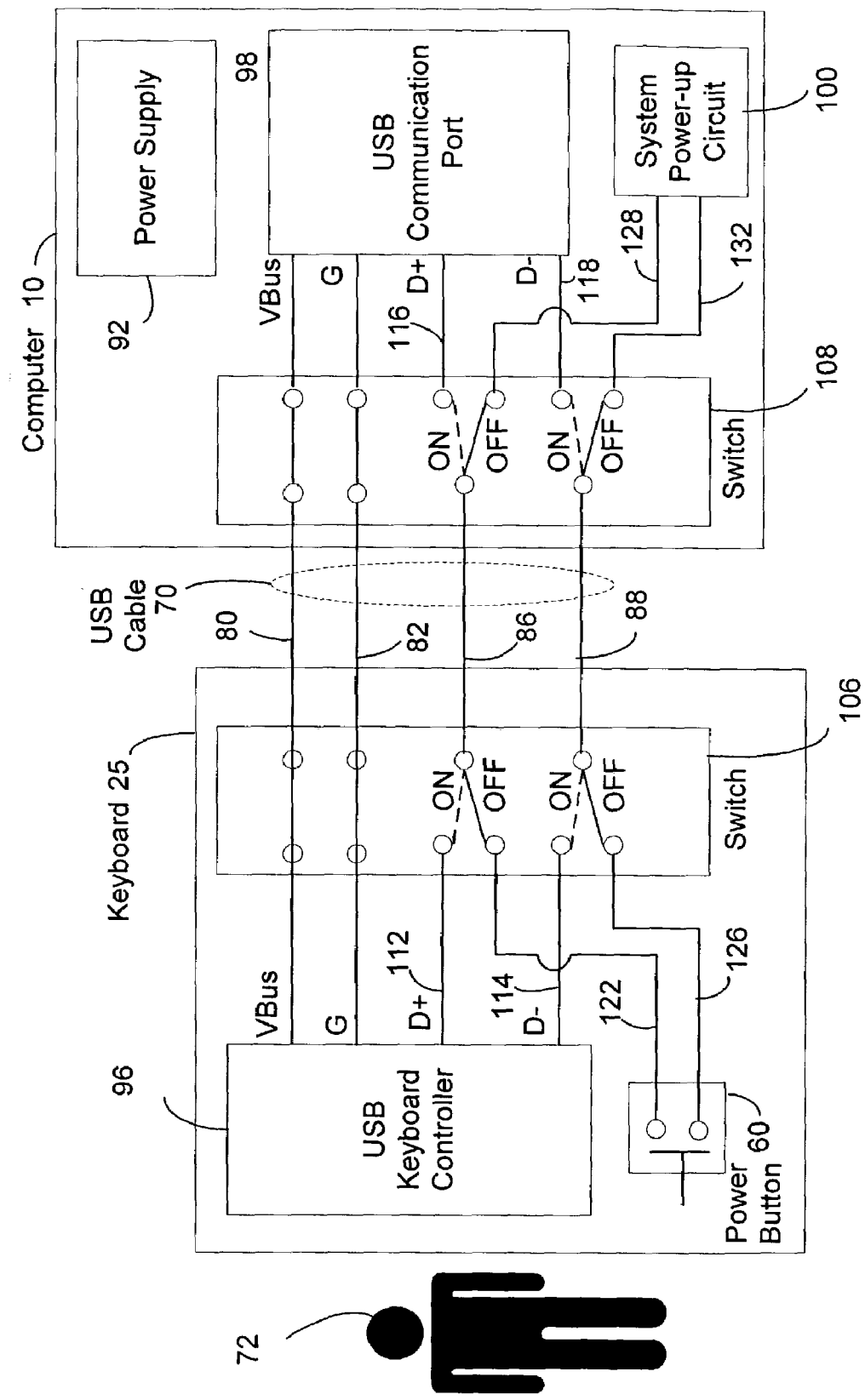
FIG. 3 is a schematic connection diagram of an embodiment of the invention in which the data wires of the USB bus are used to connect the power button on the keyboard to a system power-up circuit in the computer when the computer is in a power-down state.

Referring now to FIG. 3, the USB cable 70 connecting the computer 10 and the keyboard 25 includes at least four wires. The VBus wire 80 connects power generated by a power supply 92 in the computer to the keyboard 25 for powering the operations of the keyboard. The ground wire 82 connects the electrical ground of the computer to the electrical ground of the keyboard. The D+ wire 86 and the D− wire 88 are data lines for carrying data transmission between the keyboard 25 and the computer 10. As shown in FIG. 3, the keyboard includes a USB keyboard controller 96 for controlling the operations of the keyboard. The keyboard controller 96 is connected by the USB cable 70 to a USB port 98 in the computer, thereby allowing the keyboard controller to communicate with the computer via the D+ and D− data lines.

As shown in FIG. 3, the computer has a system power-up circuit 100. When the computer 10 is in a power-down state, this circuit initiates a power-up process in response to a trigger signal. For example, if the computer system is initially in the S4 (soft off) or S5 (off) state of the Advanced Configuration & Power Interface (ACPI) specification, when the power button 60 is pressed, the system power-up circuit 100 initiates a power-up process that puts the computer into the S0 ACPI state.

In accordance with a feature of the invention, when the computer is in the power-down state, the data wires 86 and 88 of the USB cable 70 are utilized for sending the trigger signal generated by pressing the power button 60 to the system power-up circuit 100. In other words, the data wires are used for transmitting the trigger signal in addition to their normal function of carrying data transmissions when the computer is in the powered-up state. To that end, two USB line switches 106 and 108 are utilized. One line switch 106 is located in the keyboard 25, and the other line switch 108 is located in the computer 10. When the system is powered up, the two switches 106 and 108 connect the data wires 86 and 88 of the USB bus 70 to respective data lines 116, 118 in the keyboard and data lines 112, 114 in the computer. When connected that way, the data wires can be used for their normal function of transmitting data between the keyboard controller 96 and the USB port 98. When the computer 10 is in a power-off state, the switches connect the data wires 86 and 88 of the USB cable 70 to the power button 60 on the keyboard 25 and to the system power-up circuit 100 in the computer 10, thus allowing the power button to be used to trigger the power-up circuit to start a system power-up operation. The USB line switches 106 and 108 may be implemented in the form of discrete components. Alternatively, they may be integrated into the keyboard controller 96 and the USB port 98 respectively.

In a preferred embodiment as shown in FIG. 3, each of the USB line switches 106 and 108 is a double-pole-double-throw relay. When the relay 106 is energized, it moves to an ON position where it connects the data wires 86, 88 of the USB bus to the data lines 112, 114 that lead to the keyboard controller 96. When the energizing power of the relay is turned off, the relay 106 returns to an OFF position where it connects the data wires 86, 88 of the USB bus 70 to wires 122, 126 connected to the power button 60. Similarly, when the relay 108 in the computer 10 is energized, it moves to an ON position where it connects the data wires 86, 88 of the USB bus 70 to respective data lines 116, 118 connected to the USB port. When the relay 108 is not energized, it returns to an OFF data where it connects the data wires 86, 88 to wires 128, 132 leading to the system power-up circuit 100.

To control the operation of the relays 106 and 108, the energizing power for the relays are provided by the computer system. In one implementation as shown in FIG. 3, both relays are connected to the VBus line 80 to receive the power for energizing their actuators. Thus, when the computer system is powered down, no energizing power is available for the relays, and the relays are in their OFF positions. As a result, the power button 60 on the keyboard is connected by the relays 106, 108 and the data wires 86, 88 to the system power-up circuit 100 in the computer. When the user 72 presses the power button, the electrical contact of the button 60 is closed. This brings the voltage on one data wire (e.g., the D+ wire 86) from high to low (or alternatively from low to high), thereby generating a trigger signal. This trigger signal is transmitted via the data wires of the USB cable to the system power-up circuit. In response to the trigger signal, the system power-up circuit 100 starts a power-up operation to bring the computer into to an operational state (e.g., the S0 state of ACPI). Once the computer system is powered up, the power supplies 92 of the computer system 10 are operational, and the relays 106, 108 are energized to move to their ON positions to connect the USB data wires to the data lines 112, 114, 116, 118 in the keyboard and the computer. This allows the USB data wires 86, 88 to be used for their normal data transmission functionality.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer system comprising:
    a computer having a system power-up circuit for powering up the computer and a communication port;
    a keyboard having a power button thereon and having a keyboard controller therein;
    a cable connecting the keyboard to the computer, the cable having at least one power wire and two data wires; and
    a first switch located in the keyboard and a second switch located in the computer, the first switch connecting the data wires of the cable to the keyboard controller and the second switch connecting the data wires of the cable to the communication port when the computer is powered up, and the first switch connecting the data wires of the cable to the power button of the keyboard and the second switch connecting the data wires of the cable to the system power-up circuit in the computer when the computer is powered off.

2. A computer system as in claim 1, wherein the cable is a Universal Serial Bus (USB) cable.

3. A computer system as in claim 1, wherein first and second switches are double-pole double-throw relays.

4. A computer system as in claim 3, wherein the first and second switches are connected to the power line of the cable for receiving energizing power for the relays when the computer is powered up.

5. A computer system as in claim 1, wherein the computer further includes a power button located on a housing of the computer.

6. A computer system comprising:
    a computer having a system power-up circuit for powering up the computer and a communication port;
    a keyboard having a power button thereon and having a keyboard controller therein;
    a cable connecting the keyboard to the computer, the cable having at least one power wire and two data wires;
    means for connecting the data wires of the cable to the keyboard controller and disconnecting the data wires of the cable from the power button of the keyboard when the computer is powered up, and connecting the data wires of the cable to the power button of the keyboard and disconnecting the data wires of the cable from the keyboard controller when the computer is powered off; and
    means for connecting the data wires of the cable to the communication port and disconnecting the data wires of the cable from the power-up circuit in the computer when the computer is powered up, and connecting the data wires of the cable to the power-up circuit in the computer and disconnecting the data wires of the cable from the communication port when the computer is powered off.

7. A computer system as in claim 6, wherein the means for connecting and disconnecting the data wires of the cable to and from the keyboard controller and the power button of the keyboard includes a first relay in the keyboard and the means for connecting and disconnecting the data wires of the cable to and from the communication port and the power-up circuit in the computer includes a second relay in the computer.

8. A computer system as in claim 7, wherein the first and second relays are connected to the power wire of the cable for receiving energizing power.

* * * * *